United States Patent [19]

Tsuchida et al.

[11] Patent Number: 5,002,803

[45] Date of Patent: Mar. 26, 1991

[54] METHOD FOR PROCESSING SOFT SHELLED TURTLE EGGS

[75] Inventors: Shizuo Tsuchida; Teruyoshi Aoki, both of Tokyo, Japan

[73] Assignee: Domo Corporation, Tokyo, Japan

[21] Appl. No.: 560,993

[22] Filed: Aug. 1, 1990

Related U.S. Application Data

[63] Continuation-in-part of Ser. No. 343,636, Apr. 27, 1989, abandoned.

[30] Foreign Application Priority Data

Apr. 27, 1988 [JP] Japan .................................. 63-105271

[51] Int. Cl.[5] .............................................. A23L 1/325
[52] U.S. Cl. ..................................... 426/643; 426/471; 426/473
[58] Field of Search ............... 426/614, 641, 643, 471, 426/473

[56] References Cited

U.S. PATENT DOCUMENTS 3,222,194 12/1965 Gorman et al. ................ 426/614 X

FOREIGN PATENT DOCUMENTS 58-5020 1/1983 Japan ................................... 426/641
878231 11/1981 U.S.S.R. ............................. 426/471

OTHER PUBLICATIONS

Japanese Patent Abstract, 60-105472, 6-10-85.

Primary Examiner—Arthur L. Corbin
Attorney, Agent, or Firm—Nixon & Vanderhye

[57] ABSTRACT

A nutrient food product is prepared from soft shelled turtle eggs by soaking the eggs in alcohol, breaking them, desiccating the broken eggs, powdering them with garlic extract and then emulsifying in the presence of safflower oil.

1 Claim, No Drawings

METHOD FOR PROCESSING SOFT SHELLED TURTLE EGGS

CROSS-REFERENCE TO RELATED APPLICATION

This application is a continuation-in-part of earlier application Ser. No. 07/343,636 filed Apr. 27, 1989, now abandoned.

BACKGROUND OF THE INVENTION

1. Field of the Invention

The present invention relates to a method for manufacturing processed soft shelled turtles and their eggs for nutrient food.

2. Related Art

Heretofore, many methods of manufacturing soft shelled turtle extract, processed soft shelled turtle, or eggs of soft shelled turtles as nutrient food have been proposed wherein degradation and decomposition of the various components of the starting material can be avoided. Such components include the cartilage and egg shell which include ingredients such as calcium, vitamins, and the like which are suitable for nutrient food as shown in Table I.

Table I

| Ingredients | Soft Shelled Turtle*1 (100 g) | Soft Shelled Turtle Eggs*2 (100 g) |
| --- | --- | --- |
| Calcium | 870 mg | 200 mg |
| Phosphorus | 500 mg | — |
| Iron | 5 mg | 5.1 mg |
| Sodium | 95 mg | — |
| Potassium | 190 mg | — |
| Vitamin A | | |
| Retinol | 27 μg | 50 μg |
| Carotene | — | 5 μg |
| Vitamin A I.U. | 90 | 170 |
| Vitamin B1 | 0.75 mg | 0.02 mg |
| Vitamin B2 | 0.65 mg | 0.33 mg |
| Niacin | 3 g | — |
| Vitamin C | 1 mg | — |
| Vitamin E | — | 2.6 mg |
| Choline | — | 190 mg |
| Lecithin | — | 530 mg |

*1 The soft shelled turtle includes the cartilage.
*2 The soft shelled turtle eggs include the egg shells.

For example, a method for manufacturing soft shelled turtle extract is disclosed in Japanese Patent Application First Publication, No. 52695/87. The method includes the steps of soaking living soft shelled turtles in dilute alcohol (low-grade spirits), and adding ginseng, honey, and the like. In Japanese Patent Application First Publication No. 32199/87, a method for manufacturing processed soft shelled turtle is described. The raw material is prepared by cutting the flesh, shell, and the like of a soft shelled turtle into pieces, then frying the material thus obtained. The products mentioned above are purported to be beneficial due to ascribed salutary effects of the component ingredients.

Although the entire adult turtle is employed in manufacturing the above products, only a minimal quantity of the desired materials is obtained. The maceration and trituration process also requires a considerable length of time.

Soft shelled turtle eggs are also known to contain many of the desired components as nutrient food contained in the flesh of the adult soft shelled turtle, as shown in Table I. However, the eggs are not available throughout the year, as the soft shelled turtle's egg laying period is generally limited to about 6 months out of the year. Thus, a method to provide the soft shelled turtle egg extract or processed soft shelled turtle egg at all times is desirable.

Accordingly, an object of the present invention is to solve the above problems and to provide a method for manufacturing processed soft shelled turtles and their eggs while avoiding denaturation of the various component ingredients. By this means, nutrient food including the processed eggs as well as processed soft shelled turtle can be made available throughout the year.

SUMMARY OF THE INVENTION

In order to achieve the above object, the present invention provides a method of manufacturing processed soft shelled turtles and their eggs for nutrient food while avoiding degradation and deterioration of the various components of the turtles and eggs which are desired to be included in the final product. One aspect of the method of the present invention includes the consecutive steps of:

(a) soaking eggs in an alcohol solution;

(b) breaking the alcohol-soaked eggs at about 15° C. to 35° C., thus creating a mixture of egg white, yolk, and broken shell fragments;

(c) desiccating the mixture obtained in step (b) above in a vacuum at about 15° C. to 35° C.;

(d) powdering the desiccated egg mixture obtained in step (c) with an odorless garlic extract at about 15° C. to 35° C.;

(e) combining safflower oil with the powder obtained in step (d) above and emulsifying at about 15° C. to 35° C.

Another aspect of the method of the present invention includes the consecutive steps of:

(a) soaking an adult soft shelled turtle in an alcohol solution;

(b) cutting into pieces the flesh, shell, entrails, and other desired portions of the adult soft shelled turtle at about 15° C. to 35° C.;

(c) desiccating the product obtained in step (b) above in a vacuum at about 15° C. to 35° C.;

(d) powdering the desiccated turtle product with an odorless garlic extract;

(e) combining safflower oil with the powder obtained in the step (d) above and emulsifying at about 15° C. to 35° C.

DETAILED DESCRIPTION OF THE PREFERRED EMBODIMENTS

One example prepared by preparing eggs of soft shelled turtles for nutrient food according to the present invention will be explained. First of all, 1 kg of eggs of soft-shelled turtles, which were soaked in kaoliang spirits, were broken into pieces by means of a small corn crusher at around room temperature (about 15° C. to 35° C.). Then, the alcohol and water was removed in a rotary vacuum still at about 15° C. to 35° C. The dried mixture thus obtained was placed in a pressure mixer with an odorless garlic extract and the resulting mixture was combined with safflower oil and an emulsifier to form a gel at about 15° C. to 35° C.

The gel thus obtained may be kept in a tube at about 15° C. to 35° C. and easily applied as desired to any food, for example, mixed in salad dressing, catsup, and the like. It may also be dispensed in capsules as a nutrient agent so that the gel is easily administered. For example, the composition of one capsule prepared containing 300 mg of the obtained gel is shown in the following Table II.

TABLE II

| Ingredients | Composition | |
|---|---|---|
|  | Ratio (%) | Amount(mg) |
| Soft-shelled turtle's egg | 15 | 45 |
| Odorless garlic extract | 11 | 33 |
| Safflower oil | 64 | 192 |
| Emulsifier | 10 | 30 |
| Total | 100 | 300 |

The process of the example described above may also be applied to the cut up flesh, shell, entrails, and other desired portions of the adult soft shelled turtle.

According to the present invention, a soft shelled turtle or its eggs may be powdered without diminishing the quantity or causing the denaturation of the desired components. This is accomplished by fragmenting the eggs or adult turtles at about 15° C. to 35° C., then desiccating the obtained material in a vacuum at about 15° C. to 35° C. At this point, the material can be stored for an extended period without significant decomposition. Thus the material prepared from the eggs is readily available outside the turtle's egg laying season. Furthermore, according to the invention, the powdered eggs or adult turtles may be suspended in a gel by combining the dried egg powder with odorless garlic extract at about 15° C. to 35° C., then mixing with safflower oil and an emulsifier at about 15° C. to 35° C. The gel thus obtained may be dispensed directly, or in the form of a capsule, or other dispensing means.

What is claimed is:

1. A method for manufacturing a nutrient food product from soft shelled turtle eggs while avoiding decomposition and denaturation of the component substances of the turtle eggs comprising the following consecutive steps of:
   (a) soaking soft shelled turtle eggs in an alcohol solution;
   (b) breaking the alcohol-soaked eggs at about 15° C. to 35° C., thus creating a mixture of egg white, yolk, and broken shell fragments;
   (c) desiccating the mixture obtained in step (b) in a vacuum at about 15° C. to 35° C.;
   (d) powdering the desiccated egg mixture obtained in step (c) with an odorless garlic extract at about 15° C. to 35° C.; and
   (e) combining safflower oil with the powder obtained in step (d) above and then emulsifying the powder at about 15° C. to 35° C.

* * * * *